US008953047B2

(12) United States Patent
Martinussen (10) Patent No.: US 8,953,047 B2
(45) Date of Patent: Feb. 10, 2015

(54) IMAGING SYSTEMS WITH SIGNAL CHAIN VERIFICATION CIRCUITRY

(71) Applicant: Aptina Imaging Corporation, George Town, Cayman Islands (KY)

(72) Inventor: Tore Martinussen, Strommen (NO)

(73) Assignee: Aptina Imaging Corporation, George Town (KY)

( * ) Notice: Subject to any disclaimer, the term of this patent is extended or adjusted under 35 U.S.C. 154(b) by 0 days.

(21) Appl. No.: 13/872,665

(22) Filed: Apr. 29, 2013

(65) Prior Publication Data

US 2013/0293724 A1   Nov. 7, 2013

Related U.S. Application Data

(60) Provisional application No. 61/641,860, filed on May 2, 2012.

(51) Int. Cl.
   H04N 17/00   (2006.01)
   H04N 5/367   (2011.01)

(52) U.S. Cl.
   CPC ............. *H04N 17/002* (2013.01); *H04N 5/367* (2013.01)
   USPC ........................................... 348/175; 348/187

(58) Field of Classification Search
   USPC ......... 348/175, 177, 180, 187, 241, 243, 294, 348/244, 246, 251, 307; 257/297, 291, 292, 257/294, 308
   See application file for complete search history.

(56) References Cited

U.S. PATENT DOCUMENTS

| | | | |
|---|---|---|---|
| 6,388,245 B1 | 5/2002 | Lee | |
| 6,577,748 B2 | 6/2003 | Chang | |
| 7,141,774 B2 | 11/2006 | Yuyama | |
| 7,724,293 B2 * | 5/2010 | Mauritzson | 348/294 |
| 7,747,087 B2 | 6/2010 | Laude et al. | |
| 7,791,664 B1 | 9/2010 | Koifman | |
| 8,531,566 B2 * | 9/2013 | Cieslinski | 348/308 |
| 8,730,330 B2 * | 5/2014 | Solhusvik et al. | 348/187 |
| 2008/0169414 A1 * | 7/2008 | Li | 250/208.1 |
| 2008/0225144 A1 | 9/2008 | Mauritzson | |
| 2008/0303905 A1 * | 12/2008 | Chinnaveerappan | 348/187 |
| 2010/0026783 A1 | 2/2010 | Chiu et al. | |
| 2010/0283875 A1 | 11/2010 | Naskali et al. | |

FOREIGN PATENT DOCUMENTS

| | | |
|---|---|---|
| EP | 1881692 | 1/2008 |
| WO | 2008036289 | 3/2008 |

OTHER PUBLICATIONS

Solhusvik, U.S. Appl. No. 13/399,912, filed Feb. 17, 2012.

\* cited by examiner

*Primary Examiner* — Trang U Tran
(74) *Attorney, Agent, or Firm* — Treyz Law Group; Kendall P. Woodruff; Michael H. Lyons (57) ABSTRACT

An imaging system may include an array of image pixels and verification circuitry. The verification circuitry may inject a test voltage into the pixel signal chain of a test pixel. The test voltage may be output on a column line associated with the column of pixels in which the test pixel is located. The test signal may be provided to a column ADC circuit for conversion from an analog test signal to a digital test signal. Verification circuitry may compare the digital output test signal with a predetermined reference signal to determine whether the imaging system is functioning properly (e.g., to determine whether column ADC circuits or other circuit elements in the pixel signal chain are functioning properly). If the output test signals do not match the expected output signals, the imaging system may be disabled and/or a warning signal may be presented to a user of the system.

14 Claims, 6 Drawing Sheets

IMAGING SYSTEMS WITH SIGNAL CHAIN VERIFICATION CIRCUITRY

This application claims the benefit of provisional patent application No. 61/641,860, filed May 2, 2012, which is hereby incorporated by reference herein in its entirety.

BACKGROUND

This relates generally to imaging systems and, more particularly, to imaging systems that use verification circuitry to test the integrity of the imaging system.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Over the lifetime of an electronic device, image sensors in the electronic device may be prone to failure. Conventional image sensors are sometimes provided with methods for testing the functionality of the image sensor when the electronic device is in stand-by mode. However, failure or error may occur during active operation of the electronic device or may otherwise be undetectable during stand-by mode.

It would therefore be desirable to provide improved imaging systems with capabilities to verify the functionality of the imaging system during active operation.

DETAILED DESCRIPTION

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. However, it may be desirable to continuously monitor the status of imaging system components during operation of the imaging system, particularly in situations in which vehicle safety may be influenced by the quality of imaging data provided by the imaging system. Imaging systems may be provided having this type of on-the-fly (e.g., real-time) verification capability.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). An image sensor may include verification circuitry for verifying the correct operation of the image sensor. For example, in situations in which images captured by the image sensors are used as input to an active control system for a vehicle, verification circuitry in the image sensor may be configured to generate verification image data and compare the verification image data with an expected result so that incorrect image sensor data is not input into the active control system.

In some configurations, verification image data may be compared with a predetermined standard stored in the imaging system, generated by the imaging system during operation, or stored on additional circuitry that is external to the imaging system. The predetermined standard may be an expected value, may be a mathematically determined threshold, may sometimes be referred to as a "golden" standard image, may be captured during manufacturing of the imaging system or at another suitable time (e.g., during startup or shutdown of the imaging system), and/or may include one or more mathematically or experimentally determined ranges to which verification image data may be compared.

Based on the result of the comparison of the verification image data with the predetermined standard or predetermined pattern, an imaging system may be disabled (e.g., if the result is outside the predetermined range or if the result does not match a reference signal) or may continue to operate normally (e.g., if the result is within the predetermined range or if the result matches a reference signal). In some arrangements, the imaging system may remain in operation but an indicator may be presented to users to inform the users that the imaging system needs further inspection and/or repair (e.g., the imaging system may present a "check imaging system" indication when the results of verification operations indicate a potential problem in the operation of the imaging system).

Figure 1:
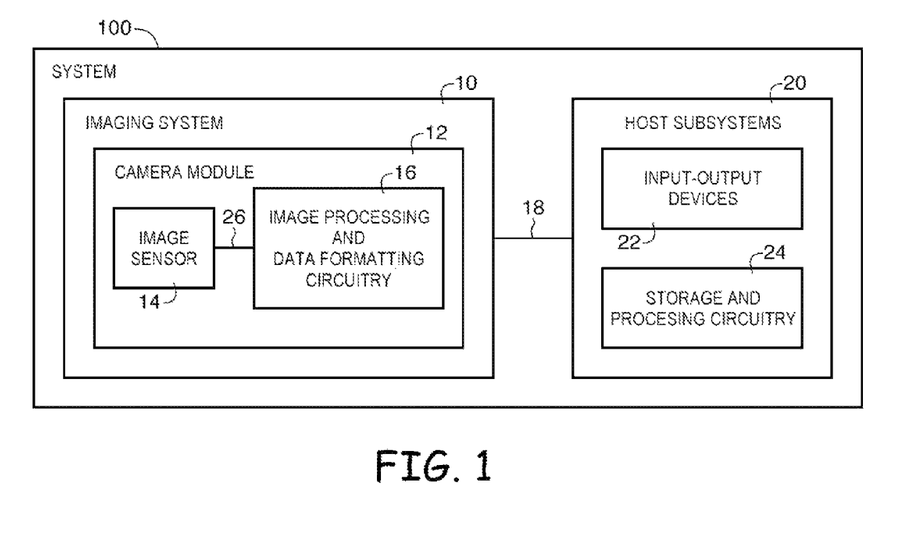
FIG. 1 is a diagram of an illustrative system that includes an imaging system and a host subsystem in accordance with an embodiment of the present invention.

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning, or other warning) in the event that verification data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

During operation of imaging system 10, camera module 12 may continuously capture and provide image frames to host subsystem 20. During image capture operations, verification circuitry associated with image sensor 14 may be occasionally operated (e.g., following each image frame capture, following every other image frame capture, following every fifth image frame capture, during a portion of an image frame capture, etc.). Images captured when verification circuitry is operated may include verification data containing verification information. Verification data may be provided to image processing circuitry 16 and/or storage and processing circuitry 24. Image processing circuitry 16 may be configured to compare the verification data to a predetermined data set stored on image processing circuitry 16. Following the comparison, image processing circuitry 16 may send status information or other verification information to host subsystem 20.

Figure 2:
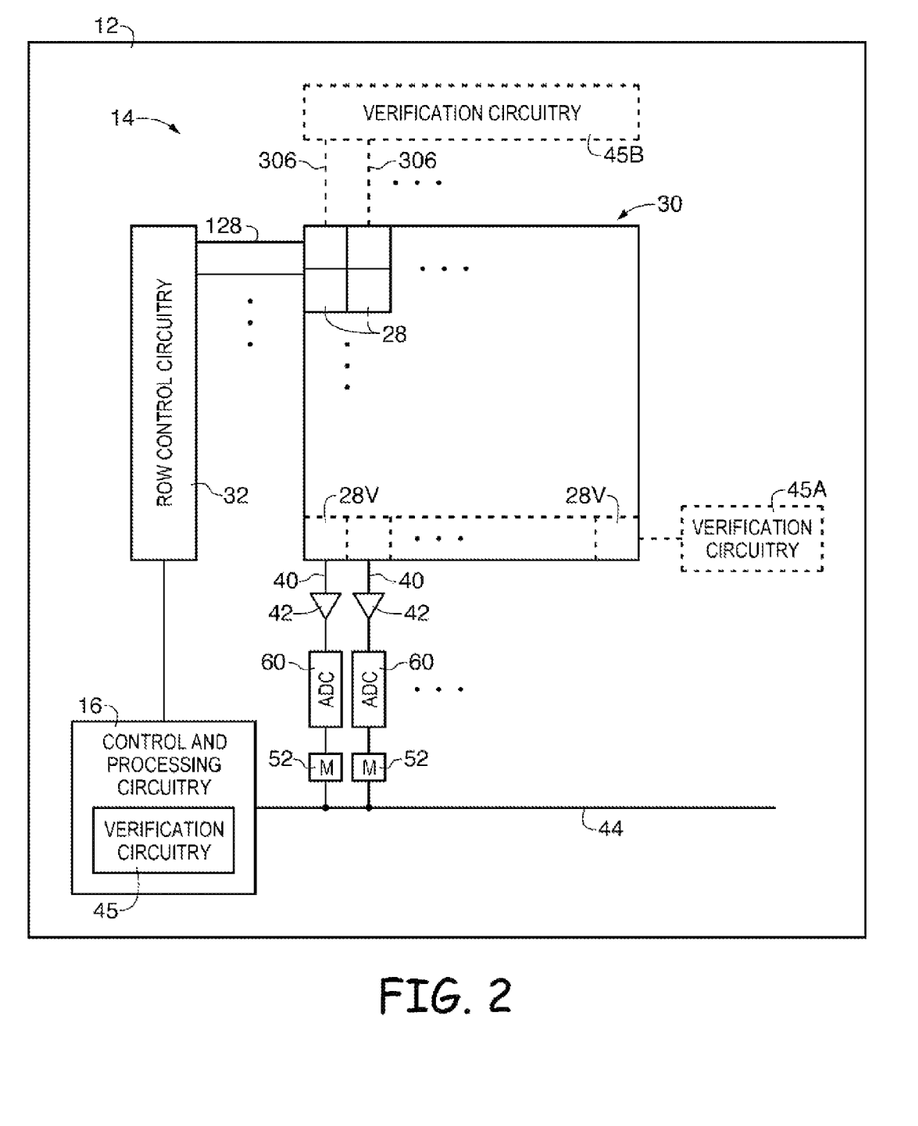
FIG. 2 is a diagram of an illustrative image sensor having an array of image pixels, verification circuitry, and control circuitry coupled to the array of image pixels in accordance with an embodiment of the present invention.

An example of an arrangement for camera module 12 is shown in FIG. 2. As shown in FIG. 2, camera module 12 includes image sensor 12 and control and processing circuitry 16. Image sensor 12 may include a pixel array such as array 30 of pixels 28. Control circuitry 16 may be coupled to row control circuitry 32 and global data path 44. Row control circuitry 32 may receive row addresses from control circuitry 16 and may supply corresponding row control signals to image pixels 28 over control paths 128. One or more conductive lines such as column lines 40 may be coupled to each column of image pixels 28 in image pixel array 30. Column lines 40 may be used for reading out image signals from image pixels 28 and for supplying bias signals (e.g., bias currents or bias voltages) to image pixels 28. During image pixel readout operations, a pixel row in image pixel array 30 may be selected using row control circuitry 32 and image data associated with image pixels 28 of that pixel row may be read out on column lines 40.

Each column line 40 may include column circuitry such as column amplifiers 42, analog-to-digital converter (ADC) circuit 60, and memory circuits 52. ADC circuit 60 may be used to convert analog signals on column lines 40 into corresponding digital signals before output to memory circuits 52.

Array 30 may have any number of rows and columns. In general, the size of array 30 and the number of rows and columns in array 30 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

Camera module 12 may include verification circuitry such as verification circuitry 45. Verification circuitry 45 may receive verification data from one or more image pixels 28. For example, one or more test signals may be injected into the pixel signal chain of one or more pixels 28 in array 30. The test signal may be output on an associated one of column lines 40 and converted to a digital test signal by ADC circuit 60. Control circuitry 16 (e.g., verification circuitry 45) may compare the output test signal with a reference signal and may evaluate the result to determine whether or not image sensor 14 is functioning properly.

In one suitable embodiment, the test signal may be applied to a source follower transistor in a verification pixel. For example, one or more rows of pixels 28 such as pixels 28V may be verification pixels that are configured to receive test voltages from verification circuitry 45A. Each verification pixel 28V (sometimes referred to as a test pixel or a dummy pixel) may have a source follower transistor and a pixel output line switchably connected to one of column lines 40. Verification circuitry 45A may apply a test voltage to the source follower transistor of one or more of verification pixels 28V. When it is desired to readout the test voltage from one of verification pixels 28V, column line 40 may be disconnected from the pixel output of that verification pixel and may be connected to the source follower transistor of that verification pixel. The test voltage may be output on column line 40 for readout. Verification circuitry 45 may receive the output test signal and may determine whether or not image sensor 14 is functioning properly based on the output test signal (e.g., whether or not ADC circuit 60 is functioning properly).

In another suitable embodiment, the test signal may be injected directly onto the photodiode of a selected pixel. With this type of arrangement, verification circuitry such as verification circuitry 45B may be coupled to pixels 28 via voltage supply line 306. The test signal may pass through the same pixel-to-output data path as image data from other pixels 28 in array 30. Verification circuitry 45 may receive the corresponding output test signal and may determine whether or not image sensor 14 is functioning properly based on the output test signal.

Row control circuitry 32 may generate signals on paths 128 as desired. For example, row control circuitry 32 may generate reset signals on reset lines in paths 128, transfer signals on transfer lines in paths 128, and row select (e.g., row readout) signals on row select lines in paths 128 to control the operation of array 14. If desired, row control circuitry 32 and array 14 may be integrated together in a single integrated circuit (as an example).

Figure 3:
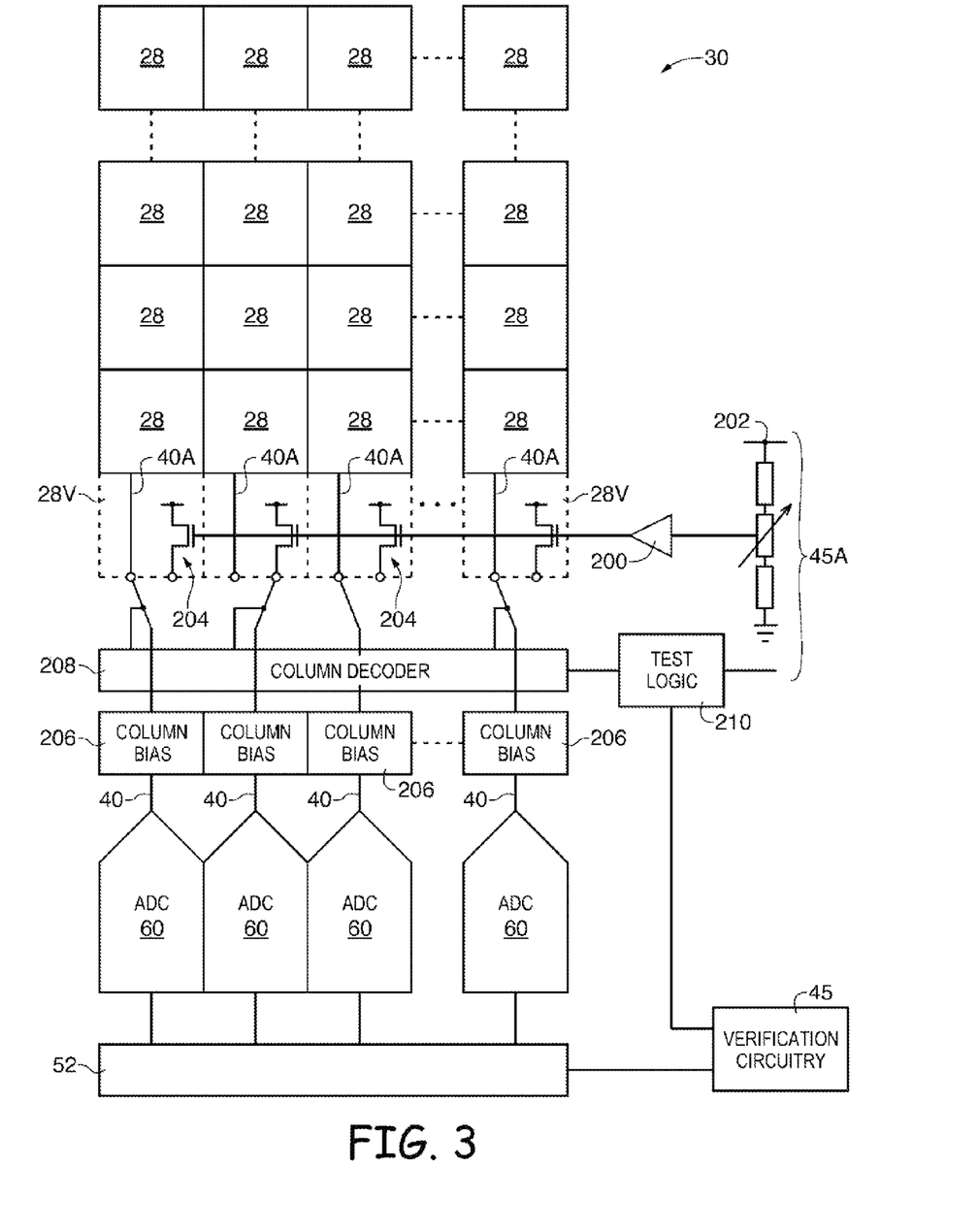
FIG. 3 is a diagram of an illustrative image sensor having verification circuitry configured to apply a test voltage to a row of test pixels in accordance with an embodiment of the present invention.

A diagram illustrating how verification circuitry 45A may be implemented in image sensor 14 is shown in FIG. 3. As shown in FIG. 3, pixel array 30 may include a plurality of image pixels 28 and a plurality of verification pixels 28V (sometimes referred to as dummy pixels 28V). Each column of pixels may be coupled to column bias circuitry such as column bias circuitry 206. Column bias circuitry 206 may provide column bias currents to the source follower transistors of image pixels 28 via column lines 40.

Verification pixels 28V may be used to output verification data (e.g., test signals) to verification circuitry 45 via column lines 40 and ADC circuits 60. Verification circuitry 45 may receive the verification data and may determine whether or not ADC circuits 60 are functioning properly based on the received verification data.

Pixel array 30 may include one or more rows of verification pixels 28V. In the illustrative example of FIG. 3, pixel array 30 includes one row of verification pixels 28V. This is, however, merely illustrative. If desired, there may be more than one row of verification pixels 28V in array 30, there may be individual verification pixels 28V in different locations in array 30, or verification pixels 28V may be arranged in any other suitable fashion within array 30.

Each verification pixel 28V includes a source follower transistor such as source follower transistor 204. The gate of each source follower transistor 204 may be coupled to the output of a buffer such as buffer 200. The input of buffer 200 may be coupled to an adjustable resistor chain such as adjustable resistor chain 202. Adjustable resistor chain 202 may form a digital-to-analog converter (DAC) circuit and may be configured to produce an adjustable test signal. The adjustable test signal may be fed to the gate of each source follower transistor 204. Each column line 40 may be configured to switch between pixel output path 40A source follower transistor 204. When it is desired to output the test signal from a verification pixel 28V in a selected column, column line 40 associated with that column may be disconnected from pixel output path 40A and may be connected to source follower 204 associated with that column. The test voltage applied to the gate of source follower transistor 204 may be fed to a corresponding one of ADC circuits 60. ADC circuit 60 may convert the analog test signal into a digital test signal and may provide the digital test signal to verification circuitry 45 via memory circuits 52. Verification circuitry 45 may compare the digital test signal with a reference signal to determine whether or not ADC circuit 60 is functioning properly.

A column decoder such as column decoder 206 may be coupled between pixel array 30 and ADC circuits 60. Column decoder 206 may select which column is to provide the test signal and may be configured to connect column line 40 of that column to source follower transistor 204 of that column. Column decoder 208 may be programmed via test logic circuitry such as test logic circuitry 210. Verification circuitry 45 may be coupled to test logic circuitry 210 and may determine which column the test signal is coming from using test logic circuitry 210.

If desired, all of ADC circuits 60 may be tested at one time. For example, the test row of dummy pixels 28V may be used to run an ADC test for all of the columns during a vertical blanking period. With one suitable embodiment, all of ADC circuits 60 may sample the same test voltage on source followers 204 and may compare the test voltage with a ground voltage. The resulting values may be provided to verification circuitry 45. Verification circuitry 45 may use this verification data to determine whether any of ADC circuits 60 are hot or cold, to provide coefficients for column correction, and/or to evaluate other operating parameters on-the-fly.

As another example, column decoder 206 may be used to select one or multiple columns to sample the test voltage twice during the vertical blanking period, which should result in an output signal of zero. Verification circuitry 45 may receive the output signal and may use the data to determine whether the sensor's column readout sequence is correct.

If desired, one ADC circuit 60 may be tested per frame. To replace the missing pixel information from a test pixel (i.e., in a pixel that receives a test signal), control and processing circuitry 16 and/or storage and processing circuitry 24 may be used to interpolate a pixel signal for that pixel. If only one ADC circuit 60 is tested per frame, only one pixel value per frame would need to be interpolated.

Figure 4:
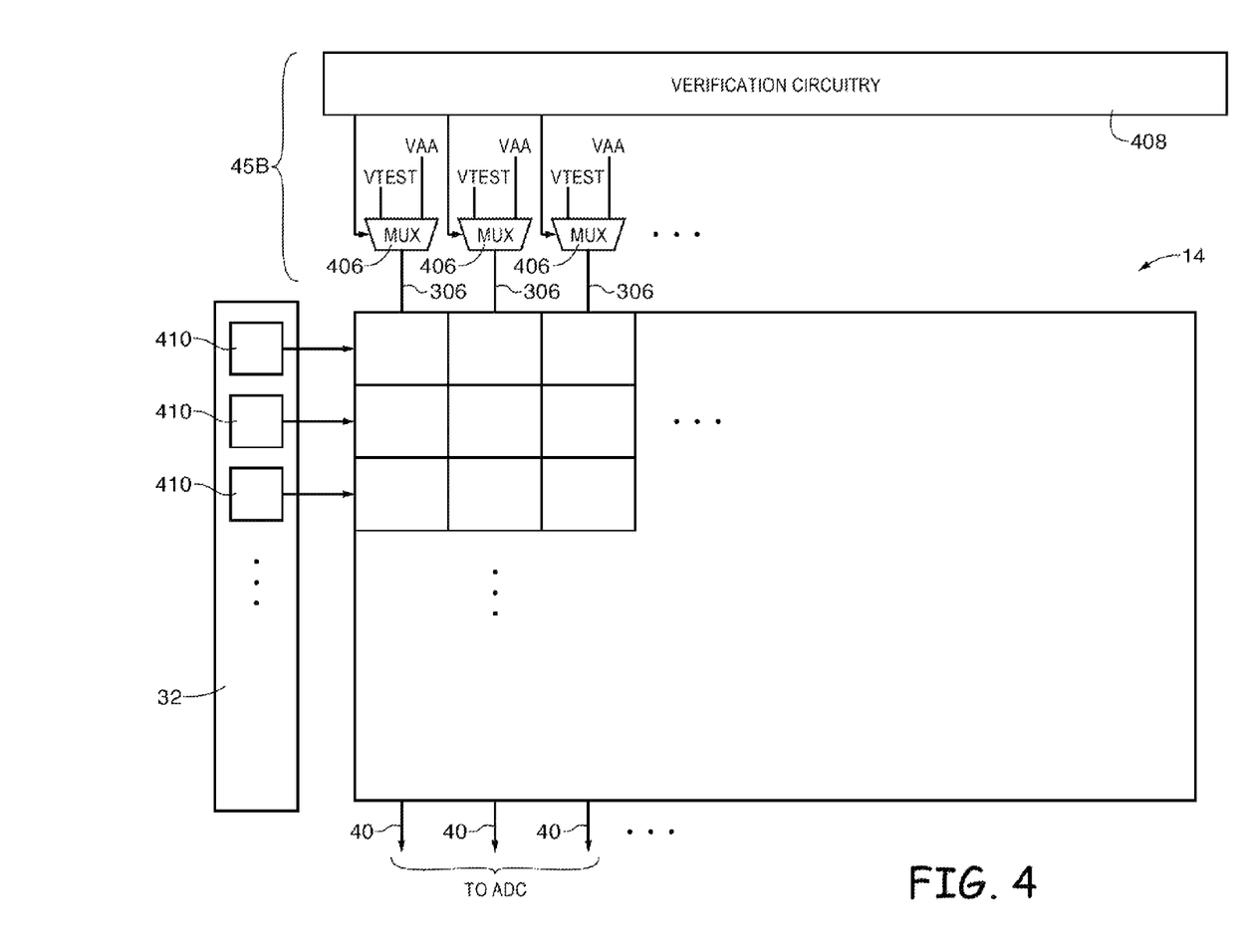
FIG. 4 is a diagram of an illustrative image pixel array having verification circuitry configured to inject a test voltage onto the photodiode of an image pixel in accordance with an embodiment of the present invention.

A diagram illustrating how verification circuitry 45B of FIG. 2 may be implemented in image sensor 14 is shown in FIG. 4. With the configuration shown in FIG. 4, verification circuitry 45B may be configured to inject test voltages directly onto the photodiodes of image pixels 28. Each column of pixels 28 may be coupled to an associated multiplexer such as multiplexer 406 ("MUX"). Multiplexer 406 may be configured to route a selected one of multiple input signals to its output terminal. In the example of FIG. 4, multiplexer 406 has two inputs corresponding to voltages $V_{AA}$ and $V_{TEST}$. A selected one of these inputs may be routed to one or more pixels via voltage supply line 306.

The output of each multiplexer 406 may be controlled by circuitry such as verification circuitry 408. Verification circuitry 408 may include circuitry for randomly selecting which pixel is to receive a test voltage $V_{TEST}$. The pixel that is selected for testing may change from frame-to-frame. For example, a pixel in a given row and a given column may receive a test voltage $V_{TEST}$ in one frame, and a different pixel in a different row and a different column may receive a test voltage $V_{TEST}$ in another frame.

Each row of pixels may be provided with pixel control circuitry such as pixel control circuitry 410. Pixel control circuitry 410 may be configured to operate pixels in a row of pixels during a test signal injection phase in which test signals are injected onto the photodiodes of pixels 28.

Figure 5:
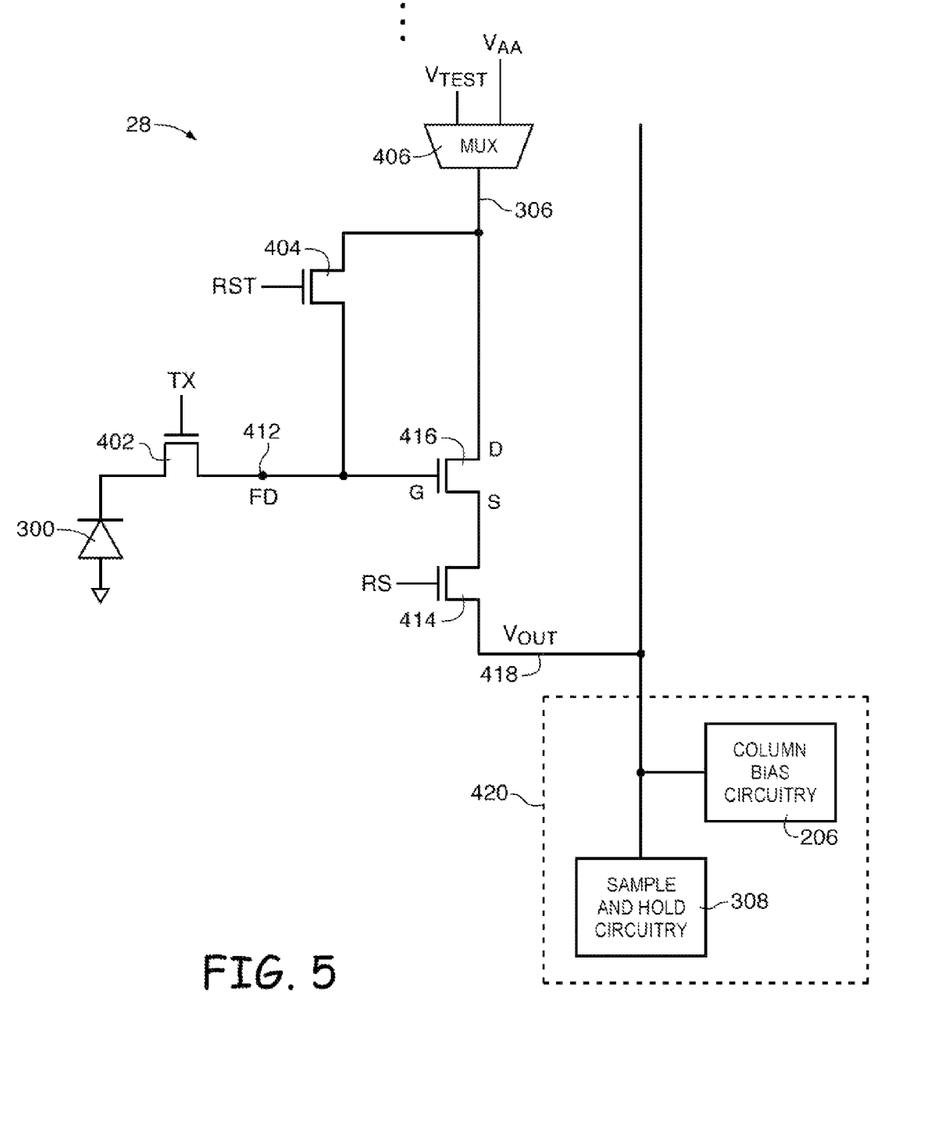
FIG. 5 is a diagram of an illustrative image pixel having a photodiode that may receive a test voltage in accordance with an embodiment of the present invention.

FIG. 5 is an illustrative example of circuitry that may be used to inject a test voltage into the photodiode of a selected one of pixels 28 (e.g., pixels 28 of FIG. 4). As shown in FIG. 5, multiplexer 406 may route a selected one of voltages $V_{AA}$ and $V_{TEST}$ to voltage supply line 306. Voltage $V_{TEST}$ may be used during a test signal injection phase, whereas voltage $V_{AA}$ may be used to reset the floating diffusion node FD prior to integration.

The test signal injection phase during which a test voltage is injected onto photodiode 300 may, for example, occur during a reset operation. Similar to a normal reset operation, the test signal injection phase may be initiated by pulsing signal RST. Multiplexer 406 may route $V_{TEST}$ to power supply line 306. Pixel control circuitry 410 may be configured to turn on transfer transistor 402 when reset transistor 404 is turned on during the test signal injection phase. This ensures that the test voltage $V_{TEST}$ from power supply line 306 is forced onto photodiode 300.

Following the test signal injection phase, transfer transistor 402 may be turned off so that normal reset operations may resume. Keeping reset transistor 404 turned on, multiplexer 406 may route voltage $V_{AA}$ to its output, thereby resetting floating diffusion region FD to $V_{AA}$. The reset control signal RST may then be deasserted to turn off reset transistor 404. After the reset process is complete, transfer gate control signal TX may be asserted to turn on transfer transistor (transfer gate) 402. When transfer transistor 402 is turned on, the test signal that has been injected onto photodiode 300 may be transferred to charge storage node 412. Charge storage node 412 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 300. The signal associated with the stored charge on node 412 is conveyed to row select transistor 414 by source-follower transistor 416.

When it is desired to read out the value of the stored charge (i.e., the value of the stored charge that is represented by the signal at the source S of transistor 416), row select control signal RS can be asserted. When signal RS is asserted, transistor 414 turns on and a corresponding signal $V_{OUT}$ that is representative of the magnitude of the charge on charge storage node 412 is produced on output path 418. In a typical configuration, there are numerous rows and columns of pixels in pixel array 30. When signal RS is asserted in a given row, a path such as path 40 can be used to route signal $V_{OUT}$ from that row to readout circuitry 420.

Column control and readout circuitry 420 that is coupled to pixels 28 along column lines 40 may include readout circuitry such as sample and hold circuitry 308 for reading out image signals and test signals from pixels 28 and column bias circuitry 206 for providing column bias currents to, for example, source follower transistors 416 of pixels 28 along that column line.

Sample and hold circuitry 308 may route the output test signal to ADC circuits 60 (FIG. 2) for conversion to a digital output test signal. ADC circuit 60 may provide the digital output test signal to verification circuitry 45, which may in turn use the test signal to determine whether or not image sensor 14 is functioning properly. Because the test signal is injected directly onto photodiode 300 of pixel 28, the test signal passes through the same pixel-to-output data path (i.e., the same pixel signal chain) as image signals from the rest of pixels 28 in array 30 and can be used to verify the entire pixel-to-output data path.

In some configurations, image processing circuitry 16 of camera module 12 may be used to compare the output test signal with a known and/or predetermined reference signal. In other configurations, host subsystem 20 may be used to compare the output test signal with a predetermined reference signal. If the output test signal does not fall within a predetermined range of the reference signal, host subsystem 20 may be configured to disable some or all of imaging system 10 and, if desired, issue a warning to the operator of system 100 (e.g., issue a warning to the driver of an automobile that uses system 100).

Figure 6:
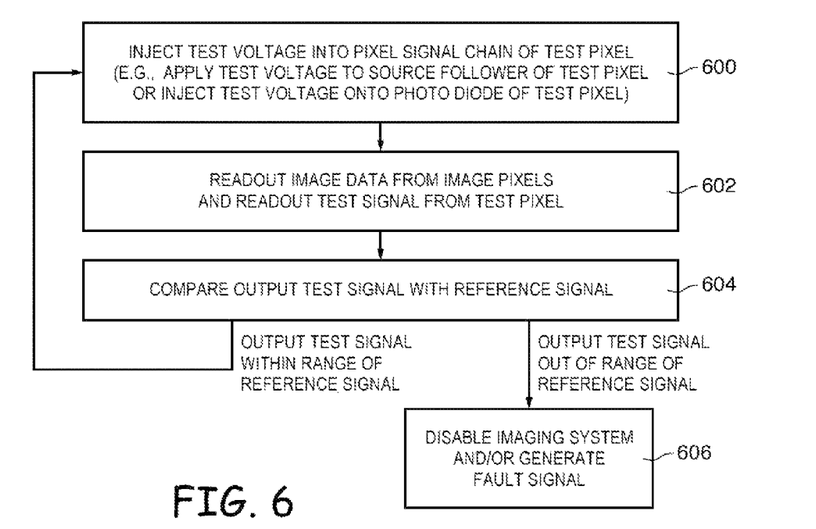
FIG. 6 is a flowchart of illustrative steps that may be used to perform continuous on-the-fly verification of imaging systems in accordance with an embodiment of the present invention.

FIG. 6 is a flowchart showing illustrative steps involved in operating a system that includes an image sensor with self-verification capabilities such as image sensor 14 of FIG. 2.

At step 600, verification circuitry may be used to inject a test voltage into the pixel signal chain of a test pixel. In one suitable embodiment, this may include using verification circuitry 45A of FIG. 3 to apply a test voltage to source follower 204 of verification pixel 28V. In another suitable embodiment, this may include using verification circuitry 45B of FIG. 4 to inject a test voltage onto photodiode 300 of an image pixel 28.

At step 602, the test signal may be read out from the test pixel and image data may be read out from image pixels in pixel array 30. If the test voltage was applied to the source follower of a verification pixel (e.g., as in the embodiment shown in FIG. 3), step 602 may include using column decoder circuitry 208 to disconnect the column output line from the pixel output path and connect the column output line to the source follower. The test voltage may be routed from the source follower to the column output line and may be provided to verification circuitry 45 via ADC circuits 60. If the test voltage was injected directly onto the photodiode of a test pixel (e.g., as in the embodiment shown in FIGS. 4 and 5), the test voltage may pass through the same pixel-to-output signal path as image signals from other image pixels 28 in the pixel array. During pixel readout operations, the test signal may be output on column lines 40 and provided to verification circuitry 45 via ADC circuits 60.

At step 604, verification circuitry 45 may be used to compare the output test signal with a predetermined reference signal. If the output test signal is within a predetermined range of the reference signal, processing may return to step 600 and imaging system 10 may resume the cycle of image capture and imaging system verification while system 100 continues to operate. This may include, for example, injecting a test voltage into a different test pixel in a different location in pixel array 30.

If the output test signal is not within a predetermined range of the reference signal, processing may proceed to step 606. At optional step 606, host subsystem 20 may disable some or all of imaging system 10 and, if desired, generate a fault signal such as an audible or visible failure alert signal for an operator of system 100 (e.g., an operator of a vehicle including a vehicle safety system such as system 100 may receive an alert signal). In some arrangements, imaging system 10 may remain in operation but an indicator may be presented to the operator to inform the operator that the imaging system needs further inspection and/or repair (e.g., the imaging system may present a "check imaging system" indication when the results of verification operations indicate a potential problem in the operation of the imaging system).

Figure 7:
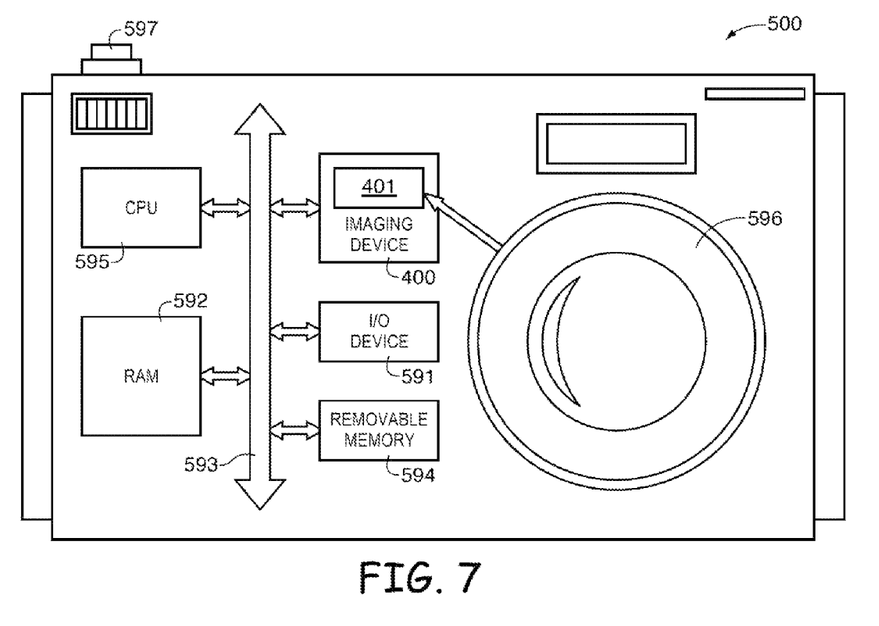
FIG. 7 is a block diagram of a system employing the embodiments of FIGS. 1, 2, 3, 4, and 5 in accordance with an embodiment of the present invention. invention.

FIG. 7 shows in simplified form a typical processor system 500, such as a digital camera, which includes an imaging device 400. Imaging device 400 may include a pixel array 401 having pixels of the type shown in FIG. 2 (e.g., pixel array 401 may be an array of pixels 28) formed on an image sensor SOC. Pixel array 401 may include pixel signal chain verification circuitry as described above. The pixel signal chain verification circuitry may be configured to inject a test signal into the signal chain of a selected pixel (sometimes referred to as a "test pixel"). The test signal may be injected directly onto the photodiode of the selected pixel or may be applied to a source follower in a dummy pixel. Image readout circuitry may readout image data from image pixels while reading out the test signal from the test pixel. A column ADC circuit may convert the test signal from an analog test signal to a digital test signal. Verification circuitry may compare the output test signal with a reference signal to determine whether the circuit elements in the pixel signal chain are functioning properly.

Processor system 500 is exemplary of a system having digital circuits that may include imaging device 400. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 500, which may be a digital still or video camera system, may include a lens such as lens 596 for focusing an image onto a pixel array such as pixel array 401 when shutter release button 597 is pressed. Processor system 500 may include a central processing unit such as central processing unit (CPU) 595. CPU 595 may be a microprocessor that controls camera functions and one or more image flow functions and communicates with one or more input/output (I/O) devices 591 over a bus such as bus 593. Imaging device 400 may also communicate with CPU 595 over bus 593. System 500 may include random access memory (RAM) 592 and removable memory 594. Removable memory 594 may include flash memory that communicates with CPU 595 over bus 593. Imaging device 400 may be combined with CPU 595, with or without memory storage, on a single integrated circuit or on a different chip. Although bus 593 is illustrated as a single bus, it may be one or more buses or bridges or other communication paths used to interconnect the system components.

Various embodiments have been described illustrating an imaging and response system (see, e.g., system 100 of FIG. 1) including an imaging system and host subsystems. An imaging system may include one or more image sensors. Each image sensor may include an array of image pixels formed on a semiconductor substrate. Each image pixel may include one or more photosensitive elements configured to convert incoming light into electric charges.

An imaging system may include verification circuitry. The verification circuitry may inject a test voltage into the pixel signal chain of a test pixel. The test voltage may be output on a column line associated with the column of pixels in which the test pixel is located. The test signal may be provided to an associated column ADC circuit for conversion from an analog test signal to a digital test signal. Verification circuitry may compare the digital output test signal with a predetermined reference signal to determine on-the-fly whether the imaging system is functioning properly (e.g., to determine whether column ADC circuits or other circuit elements in the pixel signal chain are working properly). If the output test signals do not match the expected output signals, or if the output test signals are outside of a predetermined range of the expected output signals, the imaging system may be disabled and/or a warning signal may be presented to a user of the system.

In one suitable embodiment, the test voltage is injected into the pixel signal chain by injecting the test voltage directly onto the photodiode of a test pixel. In another suitable embodiment, the test voltage is injected into the pixel signal chain by applying the test voltage to a source follower in a test pixel. The test pixel may be an image pixel that is also used to gather image data or may be a dummy pixel that is not used to gather image data. If desired, the test pixel may move locations from frame-to-frame. For example, the row and column in which the test pixel is located may change from frame-to-frame. The missing pixel information from the test pixel (e.g., a pixel signal corresponding to image data gathered from a scene) may be interpolated such that image quality is not negatively affected by self-verification operations.

The foregoing is merely illustrative of the principles of this invention which can be practiced in other embodiments.

What is claimed is:

1. An image sensor, comprising:
   an array of image pixels having a plurality of light-receiving image pixels that generate image pixel signals and a plurality of dummy test pixels that do not gather image data, wherein each dummy test pixel comprises a source follower transistor;
   a digital-to-analog converter circuit configured to apply a test signal to the source follower transistor of each dummy test pixel; and
   a plurality of column readout lines configured to convey the image pixel signals from the image pixels and test signals from the dummy test pixels.

2. The image sensor defined in claim 1 further comprising verification circuitry configured to receive the test signals and to compare each test signal with a reference signal.

3. The image sensor defined in claim 1 further comprising a plurality of analog-to-digital converter circuits, wherein each analog-to-digital converter circuit is coupled to a respective one of the column readout lines.

4. The image sensor defined in claim 3 further comprising column decoder circuitry coupled between the source follower transistors and the analog-to-digital converter circuits, wherein the column decoder circuitry is configured to connect each column line to a respective one of the source follower transistors.

5. The image sensor defined in claim 1 wherein the digital-to-analog converter circuit comprises an adjustable resistor chain.

6. The image sensor defined in claim 1 wherein the light-receiving image pixels are arranged in rows and columns and wherein the dummy test pixels are arranged in a row adjacent to the light-receiving image pixels.

7. The image sensor defined in claim 1 further comprising a buffer coupled between the digital-to-analog converter circuit and the plurality of dummy test pixels.

8. A system, comprising:
a central processing unit;
memory;
input-output circuitry; and
an imaging device, wherein the imaging device comprises:
  an array of image pixels arranged in pixel rows and pixel columns and having a plurality of light-receiving image pixels and a plurality of test pixels, wherein each test pixel comprises a source follower transistor,
  pixel row control circuitry coupled to each pixel row of the array via a respective row control line,
  a digital-to-analog converter circuit that is separate from the pixel row control circuitry and that is configured to apply a test signal to the source follower transistor of each test pixel,
  a plurality of voltage supply lines, wherein each voltage supply line of the plurality of voltage supply lines is coupled to a respective pixel column of the array, wherein the digital-to-analog converter circuit is configured to apply the test signal to the source follower transistor of each of the test pixels via the voltage supply lines, and
  a plurality of column readout lines configured to convey image pixel signals from the image pixels and test signals from the test pixels.

9. The image sensor defined in claim 8 further comprising verification circuitry configured to receive the test signals and to compare each test signal with a reference signal.

10. The image sensor defined in claim 8 further comprising a plurality of analog-to-digital converter circuits, wherein each analog-to-digital converter circuit is coupled to a respective one of the column readout lines.

11. The image sensor defined in claim 10 further comprising column decoder circuitry coupled between the source follower transistors and the analog-to-digital converter circuits, wherein the column decoder circuitry is configured to connect each column line to a respective one of the source follower transistors.

12. The image sensor defined in claim 8 wherein the digital-to-analog converter circuit comprises an adjustable resistor chain.

13. The image sensor defined in claim 8 wherein the light-receiving image pixels are arranged in rows in columns and wherein the test pixels are arranged in a row adjacent to the light-receiving image pixels.

14. The image sensor defined in claim 8 further comprising a buffer coupled between the digital-to-analog converter circuit and the plurality of test pixels.

* * * * *